Dec. 21, 1926.
H. NYQUIST
1,611,224
METHOD AND APPARATUS FOR MEASURING FREQUENCY
Filed Dec. 19, 1923
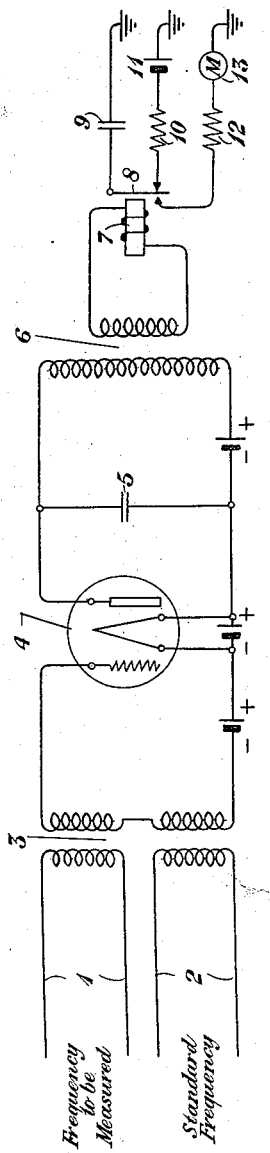
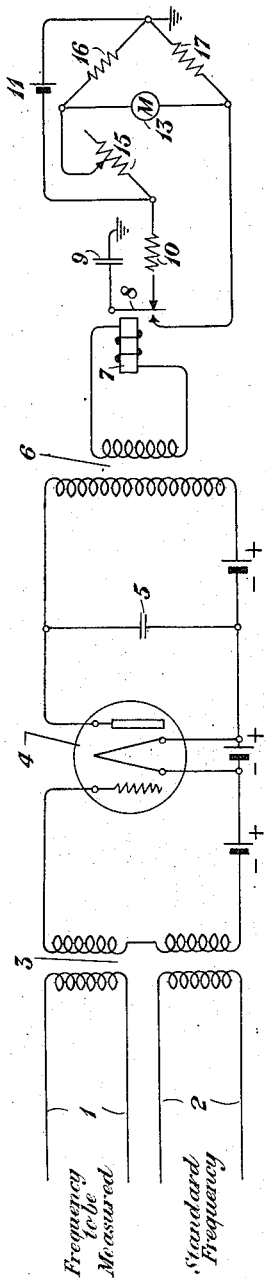
INVENTOR
H. Nyquist
BY
ATTORNEY Patented Dec. 21, 1926.

1,611,224

UNITED STATES PATENT OFFICE.

HARRY NYQUIST, OF JACKSON HEIGHTS, NEW YORK, ASSIGNOR TO AMERICAN TELEPHONE AND TELEGRAPH COMPANY, A CORPORATION OF NEW YORK.

METHOD AND APPARATUS FOR MEASURING FREQUENCY.

Application filed December 19, 1923. Serial No. 681,596.

A principal object of my invention is to provide a new and improved method and suitable apparatus for measuring the frequency of an alternating current. Another object of my invention is to provide in a simple manner for measuring the frequency to a high degree of accuracy. Still another object is to provide for measuring the frequency by comparison with a standard frequency not widely different from the frequency to be measured. These and other objects of my invention will become apparent on consideration of a limited number of examples which I have chosen to present in this specification by way of illustration. It will be understood that the following description refers to these examples and that the invention is defined in the appended claims.

Referring to the drawings, Figure 1 is a diagram of one embodiment of my invention, and Fig. 2 is a diagram of another embodiment of my invention.

In Fig. 1, the electromotive force of frequency to be measured is applied through the circuit 1 and transformer 3 to the grid of the three-electrode vacuum tube 4. A standard frequency alternating current electromotive force is also applied in the circuit 2 and the same transformer 3 to the same grid.

As is well understood, a number of different frequencies will be found in the output circuit of the tube 4. Among these will be a current of frequency equal to the difference of the frequencies in the circuits 1 and 2. Since these two frequencies are very near together, this difference frequency will be very low. The other frequencies in the output will be much higher and will be substantially shunted by the condenser 5 and the difference frequency will be applied through the transformer 6 to the winding of the relay 7.

Accordingly, the armature 8 will vibrate at this low difference frequency. On one contact, the condenser 9 will charge through the resistance 10 from the battery 11. On the other contact, the condenser 9 will discharge through the resistance 12 and the measuring instrument 13. Each cycle of movement of the armature 8 will put a definite quantity of electricity from the condenser 9 through the measuring instrument 13, so that the integral current through the measuring instrument 13 will be proportional to the frequency of vibration of the armature 8.

The measuring instrument 13 may be calibrated to give the difference frequency or it may be calibrated to give the frequency to be measured in the circuit 1. The displacement of the index in the instrument 13 will be proportional to the difference frequency and hence will give the frequency to be measured very accurately.

Fig. 2 is the same as Fig. 1 as described above to the vibrating armature 8. The circuit associated therewith may be looked upon as a Wheatstone bridge. Adjustment is made at 15, so that when the frequency to be measured is normal, that is, when the frequency difference is normal as compared with the standard, then the reading in the measuring instrument 13 is zero. It will be seen that when the condenser charges and discharges at a slower rate than normal, the bridge will be unbalanced one way and there will be a reading in the measuring instrument one way from zero. On the other hand, when the condenser 9 charges and discharges at a faster rate than normal, the bridge will be unbalanced the other way and the instrument 13 will read the other way from zero.

The difference frequency component in the output of the vacuum tube 4, to which reference has been made, is due to the nonlinear relation between output current and input voltage. It is well understood that, in general, when the output current is a nonlinear function of the input voltage, and when two sine waves of different frequency of input voltage are superposed, then there will be a variety of components in the output and among them will be a component whose frequency is the difference between the two input frequencies.

Referring to Fig. 1, it will be seen that by means of the two circuits 1 and 2 there are two electromotive forces superposed on the grid of the three-electrode vacuum tube 4. The well known "space charge effect" is in existence for the discharge between the filament and the plate, and by means of the grid the electromotive force thereof is superposed on the space charge effect to modify its influence in determining the current in the plate circuit.

I claim:

1. The method of measuring the frequency of an alternating electromotive force which consists in combining therewith a standard electromotive force of a slightly different frequency, deriving a resultant current of non-linear relation to said combined electromotive forces, separating out from the said resultant current the component of difference frequency, generating thereby a pulsatory current of this frequency, and measuring the integral value thereof to determine the frequency difference between the given electromotive force and the standard electromotive force.

2. The methd of measuring the frequency of a given alternating electromotive force which consists in superposing an electromotive force of that frequency together with an electromotive force of slightly different standard frequency on the space charge effect in a vacuum tube, establishing a pulsatory current of frequency determined by the difference frequency component in the output of that tube, and measuring the integral value of said pulsatory current.

3. The method of measuring the frequency of an alternating electromotive force which consists in combining it with an electromotive force of slightly different standard frequency, producing a current of nonlinear relation to the combined electromotive forces as aforesaid and comprising a difference frequency component, applying this difference frequency component to determine the charge and discharge of a condenser at the difference rate, and measuring the condenser current.

4. A frequency measuring device consisting of a circuit in which an electromotive force of that frequency and an electromotive force of a standard frequency are superposed, and means to measure the difference between the two frequencies and to indicate it quantitatively.

5. Means to measure a frequency consisting of a three-electrode vacuum tube to the grid circuit of which an electromotive force of the said frequency is applied, means to superpose a slightly different standard frequency in the same grid circuit whereby the output current of the tube will comprise a component whose frequency is the difference of the frequencies of the said two input electromotive forces, and means operated by said component to measure the difference frequency and indicate it quantitatively.

6. Means to measure a frequency consisting of a circuit in which an electromotive force of that frequency and an electromotive force of a slightly different standard frequency are superposed, a device to which said superposed electromotive forces are applied and of such character that its output current comprises a component of the difference frequency, a condenser, means to charge and discharge said condenser at the rate of the difference frequency, and a measuring instrument to measure the integral condenser current.

7. The method of measuring the frequency of a given electromotive force which consists in combining this electromotive force with an electromotive force of slightly different standard frequency to produce a current whose frequency is the difference of the two electromotive force frequencies, and indicating the magnitude of this difference.

8. Means to measure the frequency of an alternating electromotive force consisting of a device to which said force is applied, means also to apply to said device an alternating electromotive force of a standard frequency slightly different from that of the given electromotive force, an output circuit associated with said device, means within the device to generate a current in said output circuit of the difference frequency, and means to indicate the frequency of said current.

In testimony whereof, I have signed my name to this specification this 18th day of December, 1923.

HARRY NYQUIST.